(12) United States Patent
Maricevic et al.

(10) Patent No.: US 10,955,635 B2
(45) Date of Patent: Mar. 23, 2021

(54) NODE FIBER CONNECTORIZATION

(71) Applicant: ARRIS Enterprises LLC, Suwanee, GA (US)

(72) Inventors: Zoran Maricevic, West Hartford, CT (US); John O. Caezza, Farmington, CT (US); Scott Kahoun, East Windsor, CT (US); Scott T. Ishler, Bellefonte, PA (US); Kevin P. Orazietti, Chester, CT (US); Zhijian Sun, Avon, CT (US); Roy A. Harbert, Pittsburgh, PA (US); Brian Solomon, Plantsville, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/126,569

(22) Filed: Sep. 10, 2018

(65) Prior Publication Data

US 2020/0081215 A1 Mar. 12, 2020

(51) Int. Cl.
*G02B 6/44* (2006.01)
*G02B 6/42* (2006.01)

(52) U.S. Cl.
CPC ......... *G02B 6/4454* (2013.01); *G02B 6/4285* (2013.01); *G02B 6/448* (2013.01)

(58) Field of Classification Search
CPC ..... G02B 6/4454; G02B 6/448; G02B 6/4285
See application file for complete search history.

(56) References Cited

U.S. PATENT DOCUMENTS

| | | | |
|---|---|---|---|
| 5,029,958 A | 7/1991 | Hodge et al. | |
| 5,706,384 A | 1/1998 | Peacock et al. | |
| 5,987,207 A | 11/1999 | Hoke | |
| H2075 H * | 8/2003 | Gnauck | 398/58 |
| 7,454,141 B2 * | 11/2008 | Farmer | H04N 7/22 398/70 |
| 7,599,622 B2 * | 10/2009 | Farmer | H04J 14/0226 398/67 |
| 10,305,706 B2 * | 5/2019 | Yagil | H04B 3/23 |
| 10,382,802 B1 * | 8/2019 | Schemmann | H04B 10/299 |

(Continued)

OTHER PUBLICATIONS

International Search Report and the Written Opinion of the International Searching Authority Re: Application No. PCT/US2019/050294 ARRIS dated Dec. 16, 2019.

*Primary Examiner* — Thomas A Hollweg
*Assistant Examiner* — Mary A El-Shammaa
(74) *Attorney, Agent, or Firm* — Chernoff, Vilhauer, McClung & Stenzel, LLP (57) ABSTRACT

A HFC network includes an optical node, a first fiber optic cable, and a second fiber optic cable. The first fiber optic cable has a first end that is connected to the optical node for delivering signals to the optical node. The second fiber optic cable has a first end that is positioned within the optical node. Optical fibers of the first optic cable are ribbonized and spliced to ribbonized optical fibers of the second fiber optic cable at a spliced connection such that signals can be transmitted between the fiber optic cables. An optical fiber of the first fiber optic cable is spliced to a connectorized fiber pigtail at a spliced connection, and the connectorized fiber pigtail is optically connected to a broadband optical transceiver in the optical node. The spliced connections are stored in a fiber splice tray within the optical node.

20 Claims, 4 Drawing Sheets

(56) References Cited

U.S. PATENT DOCUMENTS

| | | | |
|---|---|---|---|
| 2002/0181925 A1* | 12/2002 | Hodge | G02B 6/445 |
| | | | 385/135 |
| 2006/0153516 A1 | 7/2006 | Napiorkowski et al. | |
| 2006/0245687 A1* | 11/2006 | Gall | H04B 10/272 |
| | | | 385/24 |
| 2009/0232500 A1* | 9/2009 | Villarruel | H04B 10/2575 |
| | | | 398/65 |
| 2011/0211799 A1* | 9/2011 | Conner | G02B 6/4471 |
| | | | 385/135 |
| 2013/0034330 A1 | 2/2013 | Barron et al. | |
| 2013/0336623 A1* | 12/2013 | Chamberlain | G02B 6/4416 |
| | | | 385/101 |
| 2015/0309271 A1 | 10/2015 | Huegerich et al. | |
| 2016/0100493 A1* | 4/2016 | Alarcon | H04Q 1/14 |
| | | | 312/293.3 |
| 2017/0237492 A1* | 8/2017 | Mutalik | H04B 10/25751 |
| | | | 398/72 |
| 2019/0020577 A1* | 1/2019 | Chapman | H04L 45/245 |
| 2019/0149245 A1* | 5/2019 | Campos | H04B 10/27 |
| | | | 398/212 |

* cited by examiner

NODE FIBER CONNECTORIZATION

TECHNICAL FIELD

The present subject matter relates to node fiber connectorization in a hybrid fiber coax (HFC) network.

BACKGROUND

Over the past twenty years, cable network operators and multiple service operators (MSOs) have relied more heavily on fiber-optic cable technology to transmit signals deeper (i.e., closer to the home) in a Point to Multi-Point (P2MP) communication network. The resulting migration of fiber being placed deeper into the network gave rise to new classes of fiber deep HFC architectures.

Some architectures focus on minimizing the number of actives and, thus, strategically placing fiber optic nodes in a position to require no further over-the-coax amplification in order for signal having sufficient strength to reach the home. These architectures are known as fiber deep node plus zero (i.e., zero number of over-the-coax amplifiers).

Some architectures focus on minimal disruption of the existing coaxial plant by replacing the last active amplifiers with fiber optic nodes and connecting those fiber optic nodes to new fiber optic cables. These architectures are known as fiber to the last active (FTTLA)—the last active being a fiber optic node. Each fiber optic node is connected to the main fiber optic transmission cable by a stub fiber optic cable. The connection between the main fiber optic and the stub fiber optic cable is stored in a fiber optic splice enclosure (FOSC) that is separate from the node. The FOSC is costly and the labor cost for installation of the FOSC can be high as well.

What is sought is a way to cost-effectively connect the fiber cable to the fiber optic nodes.

SUMMARY

Described herein is a method of node fiber connectorization for arranging a HFC network, as well as a HFC network.

An example of a HFC network comprises an optical node including an enclosure defining an interior space, and at least one broadband optical transceiver mounted within the interior space of the enclosure. A first fiber optic cable includes a plurality of optical fibers, the first fiber optic cable having a first end that is connected to the optical node for delivering signals to the optical node. At least one optical fiber of the first fiber optic cable is spliced to a connectorized fiber pigtail at a spliced connection, and the connectorized fiber pigtail is optically connected to the broadband optical transceiver. A second fiber optic cable includes a plurality of optical fibers, the second fiber optic cable having a first end that is positioned within the optical node. Optical fibers of the first fiber optic cable are ribbonized and spliced to ribbonized optical fibers of the second fiber optic cable at a spliced connection such that signals can be transmitted between the first fiber optic cable and the second fiber optic cable. The spliced connections are stored in the optical node An example of a method of arranging a HFC network includes the steps of:
- connecting a first end of a first fiber optic cable comprising a plurality of optical fibers to an optical node for delivering signals to the optical node;
- positioning a first end of a second fiber optic cable comprising a plurality of optical fibers within an interior space of the optical node;
- splicing at least one optical fiber of the first optic cable to at least one optical fiber of the second fiber optic cable at a spliced connection such that signals can be transmitted between the first fiber optic cable and the second fiber optic cable;
- splicing at least one optical fiber of the first fiber optic cable to a connectorized fiber pigtail at a spliced connection;
- optically connecting the connectorized fiber pigtail to a broadband optical transceiver of the optical node; and
- storing the spliced connections within the optical node.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Any references to "upstream" and "downstream" are viewed in the forward path direction of a signal propagating through a cable, unless noted otherwise.

Figure 1A:
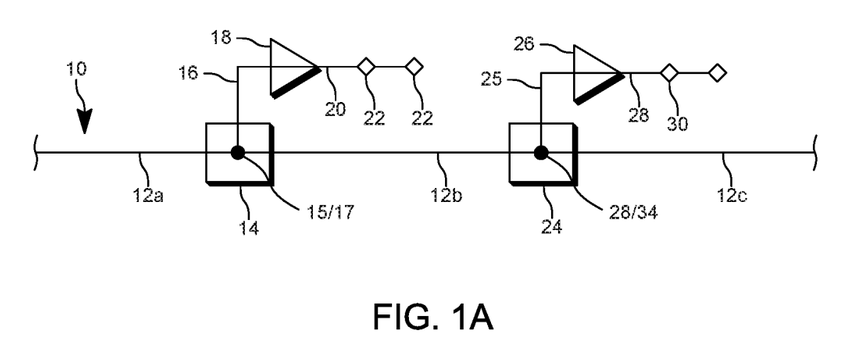
FIG. 1A depicts a section of a typical HFC network, shown schematically, including a multi-strand fiber cable connected to nodes using FOSCs.

FIG. 1A depicts a portion of a typical FTTLA system 10, shown schematically, including multi-strand fiber cables connected to nodes using fiber optic splice enclosures (FOSCs).

The typical system 10 includes a fiber optic cable 12a delivering signal into a first FOSC 14. The FOSC is an enclosure containing spliced fiber optic cables. The FOSC may be merely an enclosure that does not contain any amplifiers.

A first stub fiber optic cable 16 is optically connected between the first FOSC 14 and a first node 18. The stub cable 16 includes one or more individual loose fiber tubes. A first end of the stub cable 16 is connected to the fiber cable 12a by way of an optical splice 15 (or other optical connection), and that spliced connection 15 is stored within the interior of the FOSC 14. A second end of the stub cable 16 is positioned within the first node 18. The second end of the stub cable 16 is connectorized, i.e., terminated by an optical fiber connector, such as a fiber connector (FC) or a subscriber connector (SC). Other connector types are known to those skilled in the art and the stub cable is not limited to a particular style of connector. The optical fiber connector at the second end of the stub cable 16 is optically connected to a broadband optical transceiver contained within the first node 18. The broadband optical transceiver may comprise both a broadband optical receiver and a node optical transmitter. The broadband optical receiver and the node optical transmitter may be either combined in a single unit or separated into two different units.

As noted above, one or more tubes of the fiber cable 12a are optically connected to the first end of the stub cable 16 by way of an optical splice 15 (or other optical connection). The remaining tubes of the fiber cable 12a simply pass through the FOSC 14 (and are not cut) and form part of fiber cable 12b. This procedure of cutting one or more strands or tubes of interest and leaving intact the remaining strands or tubes is referred to as a ring-cut. Alternatively, the remaining tubes of the fiber cable 12a are optically connected to another fiber cable 12b by way of an optical splice 17 (or other optical connection). The spliced connections 17 are stored within the FOSC 14 along with the spliced connections 15.

The first node 18 converts the downstream optically modulated signal coming from stub cable 16 to an electrical signal. The first node 18 outputs the electrical signal and distributes that electrical signal along a coaxial cable 20 to one or more splitters 22 (which may be otherwise referred to as taps). The electrical signal eventually reaches homes (not shown) that are connected either directly or indirectly to the splitters 22.

The second fiber optic cable 12b extends between the first FOSC 14 and the second FOSC 24. The fiber optic cable 12b transfers the signal between the first FOSC 14 and the second FOSC 24. A second stub fiber optic cable 25 is connected between the second FOSC 24 and a second node 26. The stub cable 25 includes one or more individual fiber tubes. A first end of the stub cable 25 is connected to the fiber cable 12b by way of an optical splice 28 (or other optical connection), and that spliced connection 28 is stored within the interior of the FOSC 24. A second end of the stub cable 25 is positioned within the second node 26. The second end of the stub cable 25 is connectorized and that connector is connected to a broadband optical transceiver within the node 26.

As noted above, one or more tubes of the fiber cable 12b are optically connected to the first end of the stub cable 25 by way of an optical splice 28 (or other optical connection). The remaining tubes of the fiber cable 12b simply pass through the FOSC 24 (and are not cut) and form part of fiber cable 12c. Alternatively, the remaining tubes of the fiber cable 12b may be optically connected to a fiber cable 12c by way of an optical splice 34 (or other optical connection). The spliced connections 34 are stored within the FOSC 14 along with the spliced connection 28. The fiber cable 12c is connected to another FOSC (not shown) in the same way as described above.

Like the first node 18, the second node 26 converts the downstream optically modulated signal coming from stub cable 25 to an electrical signal. The second node 26 outputs the electrical signal and distributes that electrical signal along a coaxial cable 28 to one or more splitters 30, and the electrical signal eventually reaches homes (not shown) that are connected either directly or indirectly to the splitters 30.

As noted in the Background section, the FOSCs are costly and the labor cost for installation of the FOSC can be high as well. Described hereinafter is a way to cost-effectively connect the fiber cable to each of the last active nodes.

Figure 1B:
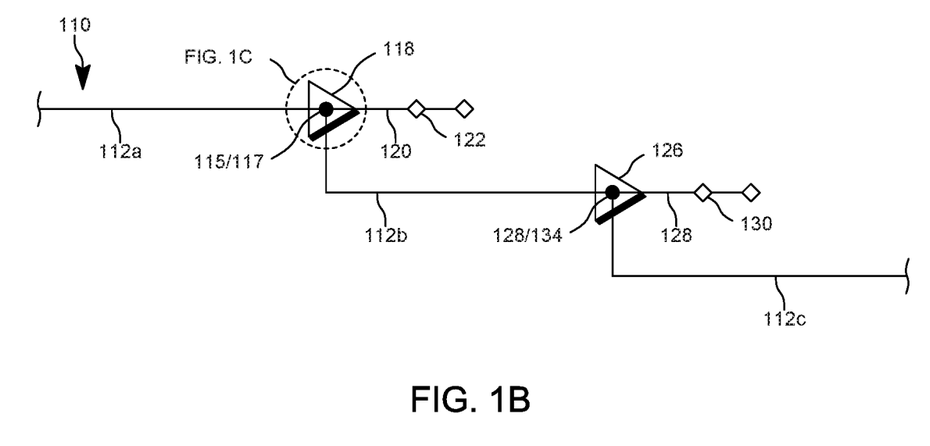
FIG. 1B depicts a section of a HFC network, shown schematically, including a multi-strand fiber cable connected to nodes without using FOSCs.
Figure 1C:
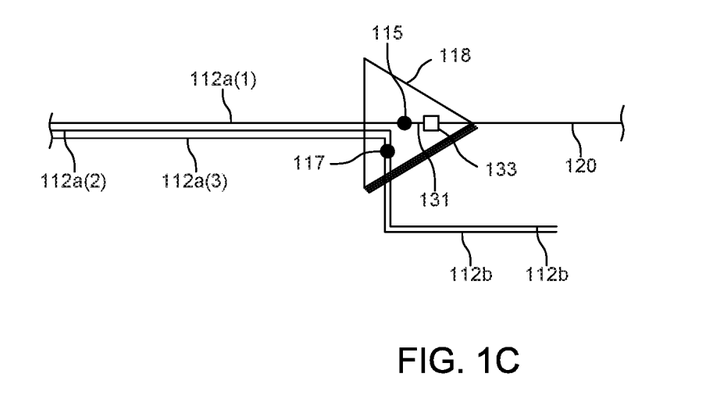
FIG. 1C depicts a detailed view of the HFC network of FIG. 1B.

FIGS. 1B and 1C depicts a portion of a FTTLA system 50, shown schematically, including a multi-strand fiber cable connected to nodes without using any FOSCs and stub cables. The system 50 includes a fiber optic cable 112a delivering signal into a first node 118. The fiber optic cable 112a includes three fiber strands 112a(1), 112a(2) and 112a(3), by way of example. It should be understood that the cable 112a may have any number of fiber strands.

As best shown in FIG. 1C, at least one strand 112a(1) of the fiber cable 112a is optically connected to a fiber pigtail 131 by a spliced connection 115. The spliced connection 115 is stored within a splice tray that is positioned within the node 118. Splicing may be performed using a fusion splicer.

The fiber pigtail 131 is a single, short optical fiber having an optical connector pre-installed on one end and a length of exposed fiber at the other end. The exposed fiber end of the pigtail is that end that is spliced to the strand 112a(1). The optical connector of the fiber pigtail 131 is optically connected to a broadband optical transceiver 133 mounted within the node 118. The broadband optical transceiver 133 converts the downstream optically modulated signal coming from the fiber pigtail 131 to an electrical signal, and distributes that electrical signal along a coaxial cable 120 to one or more splitters 122 (which may be otherwise referred to as taps). The electrical signal eventually reaches homes (not shown) that are connected either directly or indirectly to the splitters 122.

The remaining strands 112a(2) and 112a(3) of the fiber 112a are optically connected to two respective strands of a second fiber cable 112b by way of an optical ribbon splice 117 (or other optical connection). The ribbon splice 117 is stored within the splice tray (not shown) that is positioned within the node 118 along with the spliced connections 115.

To produce the optical ribbon splice 117, the strands 112a(2) and 112a(3) are first ribbonized by arranging the strands side by side in a test fixture (such as the fiber arranger offered by Sumitomo Electric Industries, Ltd.), and applying an adhesive to the arranged strands, thereby bonding the strands together. Further information on the ribbonizing process may be found at https://www.cableorganizer-.com/images/afl/fuseconnect-MPO-connectors/HowToRibbonizeFiberInLooseTubeCable.pdf, which is incorporated by reference in its entirety. The strands of the second fiber cable 112b are then ribbonized using the same process as described above (if the cable 112b is not already ribbonized). The ribbonized strands of the fiber cable 112b are then fusion spliced to the ribbonized strands 112a(2) and 112a(3) of the fiber cable 112a using a fusion splicer. A mass fusion splicer, such as a Fujikura Model 70R Fusion Splicer, may be used to fusion splice the ribbonized strands of the fiber cable 112b to the ribbonized strands 112a(2) and 112a(3) of the fiber cable 112a. The process of splicing optical fibers can be costly. However, the cost of splicing one strand is nearly the same as that of splicing ten strands (for example). Thus, it can be cost effective to first ribbonize the cables, and then splice the ribbonized cables.

Turning back to FIG. 1B, the second fiber optic cable 112*b* extends between the first node 118 and a second node 126. The second fiber optic cable 112*b* delivers signals to the second node 126. The second node 126 is substantially identical to the first node 118. Like the arrangement shown in FIG. 1C, at least one strand of the fiber cable 112*b* is optically connected to a fiber pigtail within the node 128 by a spliced connection 128. The spliced connection 128 is stored within a splice tray that is positioned within the node 126.

The optical connector of the fiber pigtail within the node 126 is optically connected to a broadband optical transceiver mounted within the node 126. The broadband optical transceiver distributes that electrical signal along a coaxial cable 128 to one or more splitters 130. The electrical signal eventually reaches homes (not shown) that are connected either directly or indirectly to the splitters 130.

The remaining strands of the fiber 112*b* are first ribbonized and then optically connected to respective ribbonized strands of a third fiber cable 112*c* by way of an optical ribbon splice 134 (or other optical connection). The ribbon splice 134 is stored within the splice tray (not shown) that is positioned within the node 126 along with the spliced connections 128. The third fiber cable 112*c* extends between the second node 126 and another node (not shown) to deliver signal further downstream.

Unlike the FTTLA system 10 of FIG. 1A, the FTTLA system 50 of FIGS. 1B and 1C dispenses with the FOSCs and stub cables, which represents a significant savings in cost and installation time.

Figure 2:
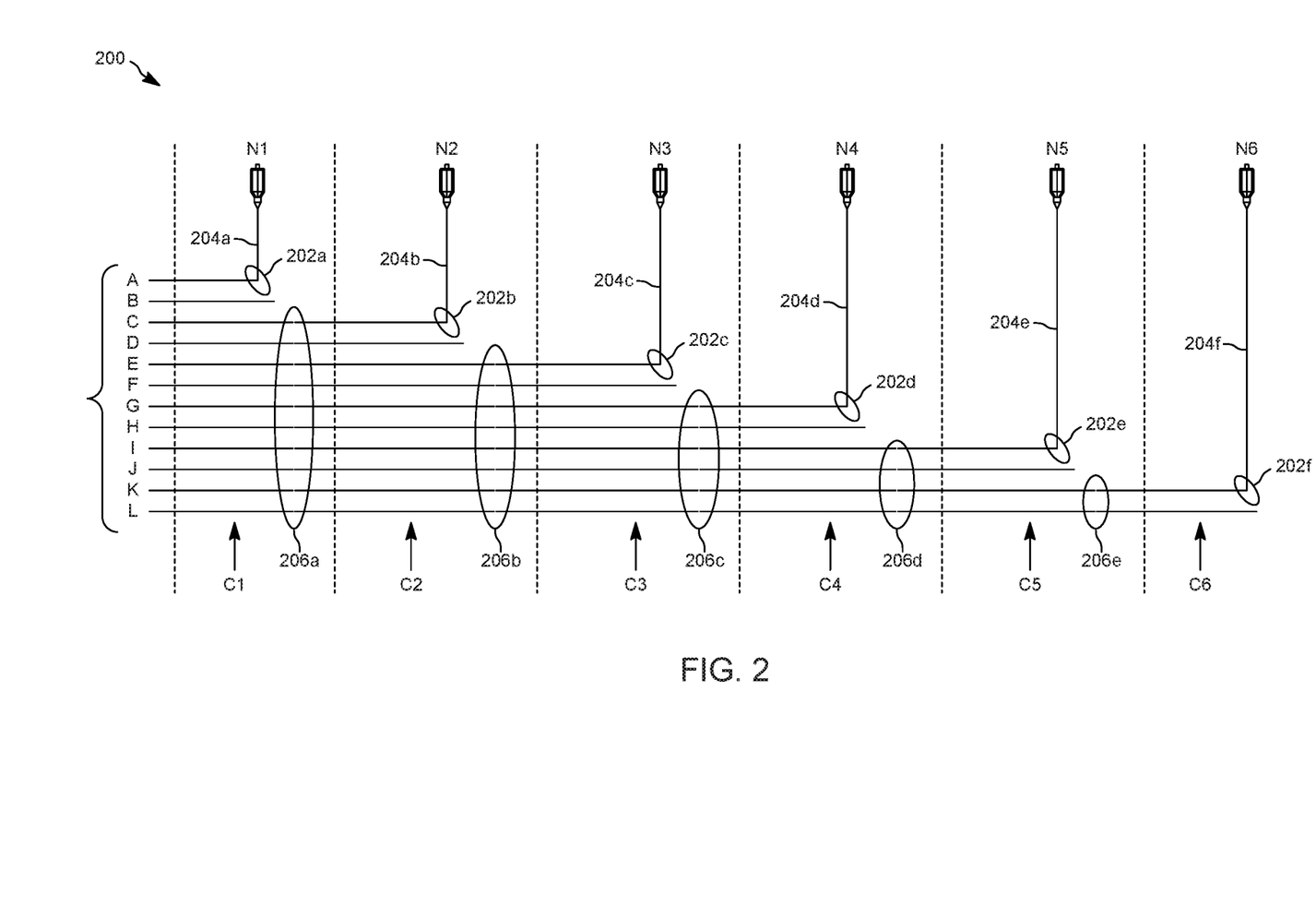
FIG. 2 depicts a schematic view of a HFC network including multi-strand fiber cables connected to a series of nodes that are interconnected in a point-to-point and hub-to-spokes topology.

FIG. 2 depicts a schematic view of an FTTLA system 200 comprising multi-strand fiber optic cables C1-C6 (referred to either individually or collectively as cable(s) C) interconnecting a series of nodes N1-N6 (referred to either individually or collectively as node(s) N). The nodes N of FIG. 2 are interconnected in a point-to-point and hub-to-spokes topology. The nodes N may be separated by thousands of feet, for example.

Like the system 50, the fiber cable terminations of the system 200 are stored in the nodes N1-N6 as opposed to separate FOSCs. Each node N includes an enclosure defining an interior space, at least one fiber entry/exit port defined on the enclosure leading to the interior space, a fiber splice tray positioned within the interior space, and at least one broadband optical transceiver positioned within the interior space. The enclosure preferably includes two fiber entry/exit ports disposed on opposing sides of the enclosure. Further details of an optical node may be found, for example, in U.S. Pat. Nos. 5,987,207 and 5,706,384, each of which is incorporated by reference herein in its entirety. Two fiber entry/exit ports are disclosed in U.S. Pat. No. 5,987,207.

The first multi-strand fiber optic cable C1 includes twelve fiber strands A-L. A small segment of the cable C1 is positioned within the first node N1, and every strand of the cable C1 is positioned within the interior space of the node N1. Strand A of cable C1 is cut from the cable C1 and spliced at connection 202*a* to a connectorized fiber pigtail 204*a*. The connectorized end of the fiber pigtail 204*a* is connected to the broadband optical transceiver within the node N1. Strand B of cable C1 is stored as a spare within a splice tray that is positioned within the interior space of the node N1. Strands C-L of cable C1 are first ribbonized and then spliced at connection 206*a* to ribbonized strands C-L of cable C2. The ribbonizing and splicing steps are the same as that described above with reference to FIG. 1C. The ribbonized connection 206*a* is stored within the splice tray of the node N1 along with strand B.

The second multi-strand fiber optic cable C2 includes ten fiber cable strands C-L and extends from node N1 to node N2. The first end of the cable C2 is positioned within node N1, whereas the second end of the cable C2 is positioned within node N2. Strand C of cable C2 is spliced to a connectorized fiber pigtail 204*b* at connection 202*b*. The connectorized end of the fiber pigtail 204*b* is connected to the broadband optical transceiver within the node N2. Strand D of cable C2 is stored as a spare within a splice tray that is positioned within the interior of the node N2. Strands E-L of cable C2 are first ribbonized and then spliced at connection 206*b* to ribbonized strands E-L of cable C3. The ribbonized connection 206*b* is stored within the splice tray of the node N2 along with strand D.

The third multi-strand fiber optic cable C3 includes eight fiber cable strands E-L and extends from node N2 to node N3. The first end of the cable C3 is positioned within node N2, whereas the second end of the cable C3 is positioned within node N3. Strand E of cable C3 is spliced to a connectorized fiber pigtail 204*c* at connection 202*c*. The connectorized end of the fiber pigtail 204*c* is connected to the broadband optical transceiver within the node N3. Strand F of cable C3 is stored as a spare within a splice tray that is positioned within the interior of the node N3. Strands G-L of cable C3 are first ribbonized and then spliced at connection 206*c* to ribbonized strands G-L of cable C4. The ribbonized connection 206*c* is stored within the splice tray of the node N3 along with strand F.

The fourth multi-strand fiber optic cable C4 includes six fiber cable strands G-L and extends from node N3 to node N4. The first end of the cable C4 is positioned within node N3, whereas the second end of the cable C4 is positioned within node N4. Strand G of cable C4 is spliced to a connectorized fiber pigtail 204*d* at connection 202*d*. The connectorized end of the fiber pigtail 204*d* is connected to the broadband optical transceiver within the node N4. Strand H of cable C4 is stored as a spare within a splice tray that is positioned within the interior of the node N4. Strands I-L of cable C4 are first ribbonized and then spliced at connection 206*c* to ribbonized strands I-L of cable C5. The ribbonized connection 206*d* is stored within the splice tray of the node N4 along with strand H.

The fifth multi-strand fiber optic cable C5 includes four fiber cable strands I-L and extends from node N4 to node N5. The first end of the cable C5 is positioned within node N4, whereas the second end of the cable C5 is positioned within node N5. Strand I of cable C5 is spliced to a connectorized fiber pigtail 204*e* at connection 202*e*. The connectorized end of the fiber pigtail 204*e* is connected to the broadband optical transceiver within the node N5. Strand J of cable C5 is stored as a spare within a splice tray that is positioned within the interior of the node N5. Strands K-L of cable C5 are first ribbonized and then spliced at connection 206*c* to ribbonized strands K-L of cable C6. The connection 206*e* is stored within the splice tray of the node N5 along with strand J.

The sixth multi-strand fiber optic cable C6 includes two fiber cable strands K-L and extends from node N5 to node N6. The first end of the cable C6 is positioned within node N5, whereas the second end of the cable C6 is positioned within node N6. Strand K of cable C6 is spliced to a connectorized fiber pigtail 204*f* at connection 202*f* The connectorized end of the fiber pigtail 204*f* is connected to the broadband optical transceiver within the node N6. Strand L of cable C6 is stored as a spare within a splice tray that is positioned within the interior of the node N6.

For each of the nodes N, although only one strand is attached to a pigtail, and one strand is used as a spare, it should be understood that any number of strands of the cable could be attached to a pigtail or used as a spare.

Figure 3:
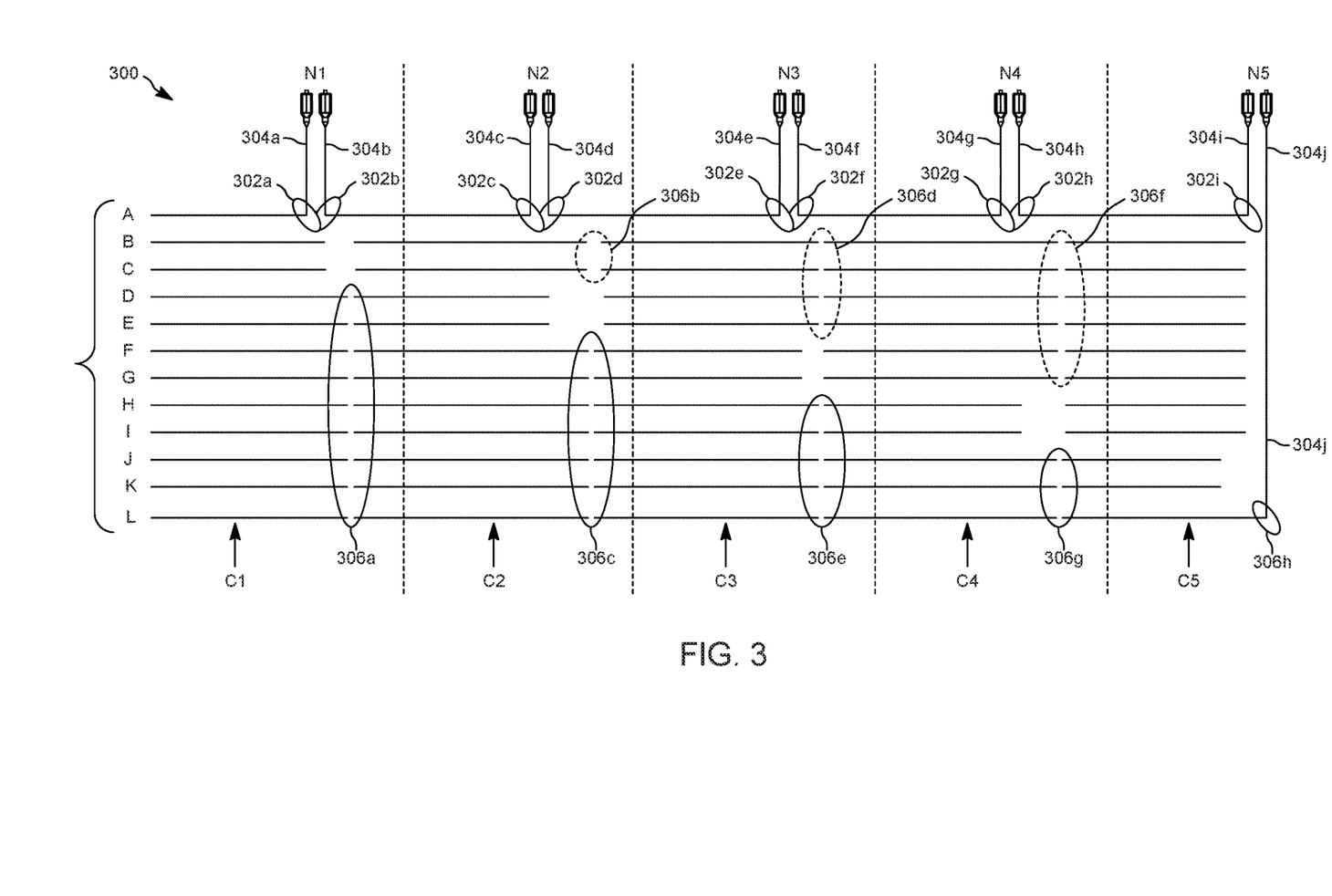
FIG. 3 depicts a schematic view of another HFC network including multi-strand fiber cables connected to a series of nodes that are interconnected in a ring and hub-to-spokes topology.

FIG. 3 depicts a schematic view of another FTTLA system 300 having a different topology for connecting the nodes N1-N6 together using the fiber optic cables C1-C5. More particularly, FIG. 3 depicts a multi-strand fiber cable connecting a series of nodes N1-N6 together in a daisy chain, ring and hub-to-spokes topology. Like the system 200, the cable terminations in the system 300 are stored in the nodes N1-N6 as opposed to separate FOSCs. Unlike the cables C1-C5 of system 200, the cables C1-C5 of system 300 include the same number of strands.

The first multi-strand fiber optic cable C1 includes twelve fiber cable strands A-L and extends into node N1 from another upstream node (not shown) or a different device. Strand A of cable C1 is spliced to a connectorized fiber pigtail 304a at connection 302a. The connectorized end of the fiber pigtail 304a is connected to the broadband optical transceiver within the node N1. Strands B and C of cable C1 are stored as spares within a splice tray that is positioned within the interior of the node N1. The first ends of strands D-L of cable C1 are first ribbonized and then spliced at connection 306a to ribbonized strands D-L of cable C2. The spliced connection 306a is stored within the splice tray of the node N1 along with the spare strands.

The multi-strand fiber optic cable C2 extends from node N1 to node N2. The first end of strand A of cable C2 is positioned within node N1 and spliced to a connectorized fiber pigtail 304b at connection 302b. The second end of strand A of cable C2 is positioned within node N2 and spliced to a connectorized fiber pigtail 304c at connection 302c. The connectorized end of the fiber pigtail 304b is connected to the broadband optical transceiver within the node N1, whereas the connectorized end of the fiber pigtail 304c is connected to the broadband optical transceiver within the node N2. Strands D and E of cable C2 are stored as spares within a splice tray that is positioned within the interior of the node N2. The strands B and C of cable C2 are (optionally) first ribbonized and then spliced at connection 306b to ribbonized strands B and C of cable C3 to provide a node to node interconnection. In FIG. 3, the optional splices are depicted in broken lines. Strands F-L of cable C2 are first ribbonized and then spliced at connection 306c to ribbonized strands F-L of cable C3. The spliced connections 306b and 306c are stored within the splice tray of the node N2 along with the spare strands.

The multi-strand fiber optic cable C3 extends from node N2 to node N3. The first end of strand A of cable C3 is positioned within node N2 and spliced to a connectorized fiber pigtail 304d at connection 302d. The second end of strand A of cable C3 is positioned within node N3 and spliced to a connectorized fiber pigtail 304e at connection 302e. The connectorized end of the fiber pigtail 304d is connected to the broadband optical transceiver within the node N2, whereas the connectorized end of the fiber pigtail 304e is connected to the broadband optical transceiver within the node N3. The strands F and G of cable C3 are stored as spares within a splice tray that is positioned within the interior of the node N3. The strands B-E of cable C3 are (optionally) first ribbonized and then spliced at connection 306d to ribbonized strands B-E of cable C4 to provide a node to node interconnection. Strands H-L of cable C3 are first ribbonized and then spliced at connection 306e to ribbonized strands H-L of cable C4. The spliced connections 306d and 306e are stored within the splice tray of the node N3 along with the spare strands.

The multi-strand fiber optic cable C4 extends from node N3 to node N4. The first end of strand A of cable C4 is positioned within node N3 and spliced to a connectorized fiber pigtail 304f at connection 302f. The second end of strand A of cable C4 is positioned within node N4 and spliced to a connectorized fiber pigtail 304g at connection 302g. The connectorized end of the fiber pigtail 304f is connected to the broadband optical transceiver within the node N3, whereas the connectorized end of the fiber pigtail 304g is connected to the broadband optical transceiver within the node N4. The strands H and I of cable C4 are stored as spares within a splice tray that is positioned within the interior of the node N4. The strands B-G of cable C4 are (optionally) first ribbonized and then spliced at connection 306f to ribbonized strands B-G of cable C5 to provide a node to node interconnection. Strands J-L of cable C4 are first ribbonized and then spliced at connection 306g to ribbonized strands J-L of cable C5. The spliced connections 306f and 306g are stored within the splice tray of the node N3 along with the spare strands.

The multi-strand fiber optic cable C5 extends from node N4 to node N5. The first end of strand A of cable C5 is positioned within node N4 and spliced to a connectorized fiber pigtail 304h at connection 302h. The second end of strand A of cable C5 is positioned within node N5 and spliced to a connectorized fiber pigtail 304i at connection 302i. The connectorized end of the fiber pigtail 304h is connected to the broadband optical transceiver within the node N4, whereas the connectorized end of the fiber pigtail 304i is connected to the broadband optical transceiver within the node N5. The strands B-K may be stored as spares within a splice tray that is positioned within the interior of the node N5. The strand L of cable C5 is positioned within node N6 and spliced to a connectorized fiber pigtail 304j at connection 306h. The connectorized end of the fiber pigtail 304j is connected to the broadband optical transceiver within the node N5.

Figure 4:
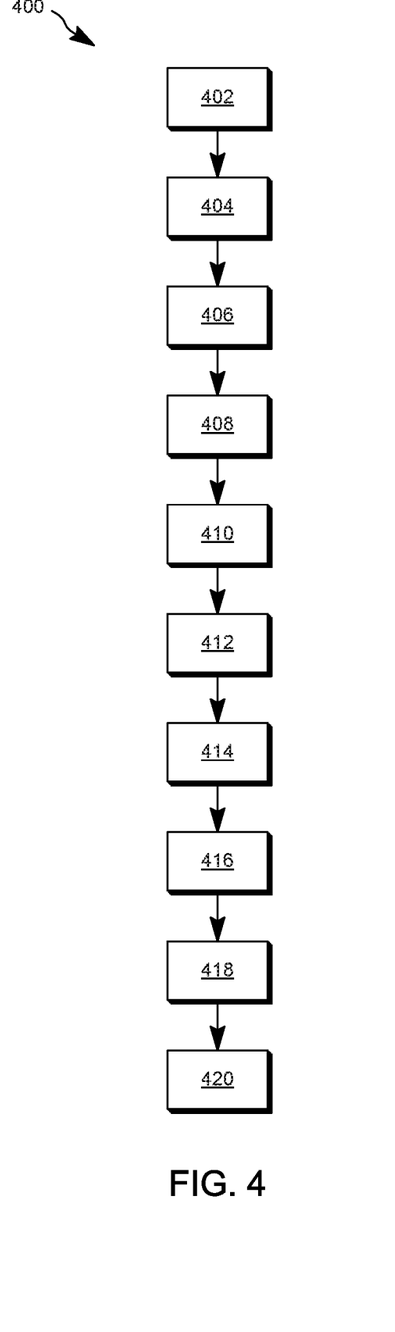
FIG. 4 is a flow diagram depicting a method of arranging a hybrid fiber coax (HFC) network.

FIG. 4 is a flow diagram depicting a method 400 of arranging a hybrid fiber coax (HFC) network. The method 400 includes steps 402 through 420, as will be described hereinafter.

Step 402: connecting a first end of a first fiber optic cable comprising a plurality of optical fibers to an optical node for delivering signals to the optical node. Step 402 may comprise delivering the first fiber optic cable through a first port in the enclosure of the optical node.

Step 404: positioning a first end of a second fiber optic cable comprising a plurality of optical fibers within an interior space of the optical node. Step 404 may comprise delivering the second fiber optic cable through a second port in the enclosure of the optical node.

Step 406: splicing at least one optical fiber of the first optic cable to at least one optical fiber of the second fiber optic cable at a spliced connection such that signals can be transmitted between the first fiber optic cable and the second fiber optic cable. Step 406 may comprise ribbonizing and then splicing at least two optical fibers of the first optic cable to at least two ribbonized optical fibers of the second fiber optic cable at a spliced connection such that signals can be transmitted between the first fiber optic cable and the second fiber optic cable.

Step 408: splicing at least one optical fiber of the first fiber optic cable to a connectorized fiber pigtail at a spliced connection.

Step 410: optically connecting the connectorized fiber pigtail to a broadband optical transceiver of the optical node.

Step 412: storing the spliced connections within the optical node. Step 412 can further comprise storing the spliced connections in a fiber splice tray of the optical node.

Step 414: splicing at least one optical fiber of the second fiber optic cable to a connectorized fiber pigtail, and connecting the connectorized fiber pigtail of the second fiber optic cable to another broadband optical transceiver within the optical node.

Step 416: connecting a second end of the second fiber optic cable to a second optical node for delivering signals to the second optical node.

Step 418: splicing at least one optical fiber of the second fiber optic cable to at least one optical fiber of a third fiber optic cable at a spliced connection such that signals can be transmitted between the first, second and third fiber optic cables, and storing the spliced connection in the second optical node.

Step 420: storing at least one optical fiber of the first fiber optic cable in the optical node as a spare fiber.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions.

The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical or similar elements in the process, method, article, or apparatus that comprises the element.

The terms "coupled" and "connected" as used herein refer to any logical, physical or electrical connection, link or the like by which signals produced by one system element are imparted to another "coupled" element. Unless described otherwise, coupled elements or devices are not necessarily directly connected to one another and may be separated by intermediate components, elements or communication media that may modify, manipulate or carry the signals. Alternatively, the connections may be direct. Each of the various couplings may be considered a separate communications channel.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A hybrid fiber coax (HFC) network comprising:
an optical node including an enclosure defining an interior space, and at least one broadband optical transceiver mounted within the interior space of the enclosure;
a first fiber optic cable comprising a plurality of optical fibers, the first fiber optic cable having a first end that is connected to the optical node for delivering signals to the optical node, wherein at least one optical fiber of the first fiber optic cable is spliced to a connectorized fiber pigtail at a spliced connection, and the connectorized fiber pigtail is optically connected to the broadband optical transceiver; and
a second fiber optic cable comprising a plurality of optical fibers, the second fiber optic cable having a first end that is positioned within the optical node, wherein optical fibers of the first fiber optic cable are ribbonized and spliced to ribbonized optical fibers of the second fiber optic cable at a spliced connection such that signals can be transmitted between the first fiber optic cable and the second fiber optic cable,
wherein the spliced connections are stored in the optical node.

2. The HFC network of claim 1 further comprising a fiber splice tray positioned within the interior space of the optical node, and wherein the spliced connections are stored in the fiber splice tray within the optical node.

3. The HFC network of claim 1 further comprising a second optical node including an enclosure defining an interior space and at least one broadband optical transceiver mounted within the enclosure of the second optical node, wherein the second fiber optic cable includes a second end that is connected to the second optical node for delivering signals to the second optical node.

4. The HFC network of claim 3, wherein the second node is the last active in the HFC network.

5. The HFC network of claim 3 further comprising a third fiber optic cable having a first end that is positioned within the second optical node, wherein optical fibers of the third fiber optic cable are ribbonized and spliced to ribbonized optical fibers of the second fiber optic cable at a spliced connection such that signals can be transmitted between the first, second and third fiber optic cables.

6. The HFC network of claim 3, wherein the nodes are interconnected in a point-to-point and hub-to-spokes topology.

7. The HFC network of claim 3, wherein the nodes are interconnected in a ring and hub-to-spokes topology.

8. The HFC network of claim 1, wherein at least one optical fiber of the first fiber optic cable is used as a spare fiber and is stored in a splice tray of the optical node.

9. The HFC network of claim 1 wherein the broadband optical transceiver of the optical node is configured to convert an optical signal from the connectorized fiber pigtail to an electrical signal and transmit the electrical signal to a coaxial cable that is connected to the node.

10. The HFC network of claim 1, wherein the optical node comprises a first port disposed in the enclosure through which the first fiber optic cable is positioned, and a second port disposed in the enclosure through which the second fiber optic cable is positioned.

11. The HFC network of claim 1, wherein the HFC network does not comprise a fiber optic splice enclosure that is separate from the optical node.

12. The HFC network of claim 1, wherein at least one optical fiber of the second fiber optic cable is spliced to a connectorized fiber pigtail, and the connectorized fiber pigtail is optically connected to another broadband optical transceiver within the optical node.

13. A method of arranging a hybrid fiber coax (HFC) network comprising:
   a. connecting a first end of a first fiber optic cable comprising a plurality of optical fibers to an optical node for delivering signals to the optical node;
   b. positioning a first end of a second fiber optic cable comprising a plurality of optical fibers within an interior space of the optical node;
   c. splicing at least one optical fiber of the first optic cable to at least one optical fiber of the second fiber optic cable at a spliced connection such that signals can be transmitted between the first fiber optic cable and the second fiber optic cable;
   d. splicing at least one optical fiber of the first fiber optic cable to a connectorized fiber pigtail at a spliced connection;
   e. optically connecting the connectorized fiber pigtail to a broadband optical transceiver of the optical node; and
   f. storing the spliced connections within the optical node.

14. The method of claim 13, wherein step (c) further comprises ribbonizing and then splicing at least two optical fibers of the first optic cable to at least two ribbonized optical fibers of the second fiber optic cable at a spliced connection such that signals can be transmitted between the first fiber optic cable and the second fiber optic cable.

15. The method of claim 13 further comprising the step of splicing at least one optical fiber of the second fiber optic cable to a connectorized fiber pigtail, and connecting the connectorized fiber pigtail of the second fiber optic cable to another broadband optical transceiver within the optical node.

16. The method of claim 13 further comprising connecting a second end of the second fiber optic cable to a second optical node for delivering signals to the second optical node.

17. The method of claim 16 further comprising splicing at least one optical fiber of the second fiber optic cable to at least one optical fiber of a third fiber optic cable at a spliced connection such that signals can be transmitted between the first, second and third fiber optic cables, and storing the spliced connection in the second optical node.

18. The method of claim 13, further comprising storing at least one optical fiber of the first fiber optic cable in the optical node as a spare fiber.

19. The method of claim 13, wherein step (a) further comprises delivering the first fiber optic cable through a first port in the enclosure of the optical node, and step (b) further comprises delivering the second fiber optic cable through a second port in the enclosure of the optical node.

20. The method of claim 13, wherein step (f) comprises storing the spliced connections in a fiber splice tray of the optical node.

\* \* \* \* \*